Jan. 18, 1966

G. F. GRONDIN ET AL 3,230,352

MEANS FOR DIVIDING A FREQUENCY BY ANY NUMBER

Filed June 18, 1962

INVENTORS
GEORGE F. GRONDIN
ROBERT L. McGHIE

BY Moody and Phillion

ATTORNEYS

Jan. 18, 1966    G. F. GRONDIN ETAL    3,230,352
MEANS FOR DIVIDING A FREQUENCY BY ANY NUMBER
Filed June 18, 1962    5 Sheets-Sheet 2

INVENTORS
GEORGE F. GRONDIN
ROBERT L. McGHIE
BY
Moody and Phillion
ATTORNEYS

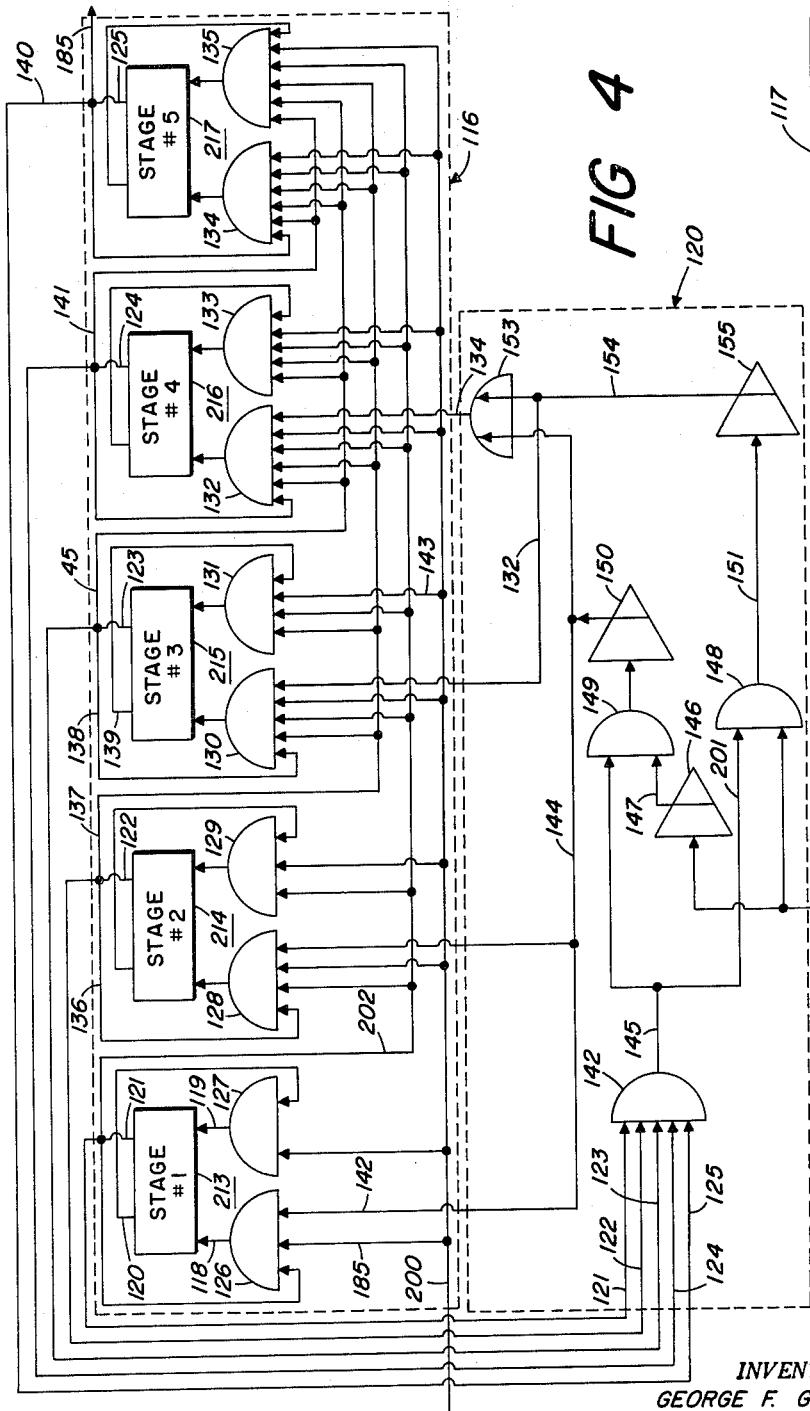

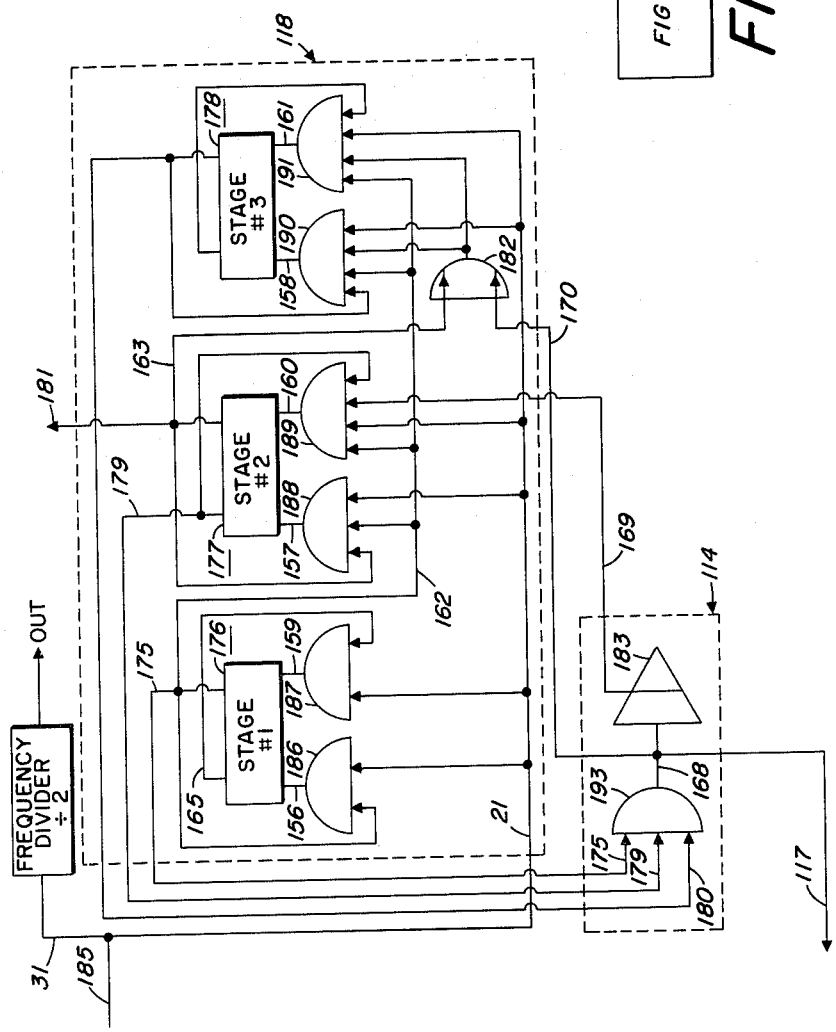

Jan. 18, 1966  G. F. GRONDIN ET AL  3,230,352
MEANS FOR DIVIDING A FREQUENCY BY ANY NUMBER
Filed June 18, 1962  5 Sheets-Sheet 5

| BINARY NUMBER | | | | | STORED COUNT | ACTUAL COUNT |
|---|---|---|---|---|---|---|
| 1 | 2 | 4 | 8 | 16 | | |
| STAGE | | | | | | |
| 1 | 2 | 3 | 4 | 5 | | |
| 1 | 1 | 0 | 1 | 0 | 11 | 0 |
| 0 | 0 | 1 | 1 | 0 | 12 | 1 |
| 1 | 0 | 1 | 1 | 0 | 13 | 2 |
| 0 | 1 | 1 | 1 | 0 | 14 | 3 |
| 1 | 1 | 1 | 1 | 0 | 15 | 4 |
| 0 | 0 | 0 | 0 | 1 | 16 | 5 |
| 1 | 0 | 0 | 0 | 1 | 17 | 6 |
| 0 | 1 | 0 | 0 | 1 | 18 | 7 |
| 1 | 1 | 0 | 0 | 1 | 19 | 8 |
| 0 | 0 | 1 | 0 | 1 | 20 | 9 |
| 1 | 0 | 1 | 0 | 1 | 21 | 10 |
| 0 | 1 | 1 | 0 | 1 | 22 | 11 |
| 1 | 1 | 1 | 0 | 1 | 23 | 12 |
| 0 | 0 | 0 | 1 | 1 | 24 | 13 |
| 1 | 0 | 0 | 1 | 1 | 25 | 14 |
| 0 | 1 | 0 | 1 | 1 | 26 | 15 |
| 1 | 1 | 0 | 1 | 1 | 27 | 16 |
| 0 | 0 | 1 | 1 | 1 | 28 | 17 |
| 1 | 0 | 1 | 1 | 1 | 29 | 18 |
| 0 | 1 | 1 | 1 | 1 | 30 | 19 |
| 1 | 1 | 1 | 1 | 1 | 31 | 20 |
| 1 | 1 | 0 | 1 | 0 | 11 | 21-0 |
| 0 | 0 | 1 | 1 | 0 | 12 | 1 |

FIG 7

INVENTORS
GEORGE F. GRODIN
ROBERT L. McGHIE
BY Moody and Phillion
ATTORNEYS

United States Patent Office 3,230,352
Patented Jan. 18, 1966

3,230,352
MEANS FOR DIVIDING A FREQUENCY
BY ANY NUMBER
George F. Grondin, Tustin, and Robert L. McGhie, Pacoima, Calif., assignors to Collins Radio Company, Cedar Rapids, Iowa, a corporation of Iowa
Filed June 18, 1962, Ser. No. 203,693
10 Claims. (Cl. 235—156)

This invention relates, generally, to frequency dividers and, more particularly, to means for dividing a given frequency to produce a resulting frequency which is not an integral submultiple of the original frequency.

In many equipments there is available a standard frequency. Often it is desirable to develop a second frequency which is less than the standard frequency but which is not an exact submultiple of the standard frequency. To be specific, assume that a signal having a frequency of 100 kc. is generated by suitable oscillator means in an equipment. Assume further, that it is desired to generate a signal having a frequency of 2400 cycles. Obviously, such frequency cannot be obtained simply by dividing the 100 kc. signal by integral values. Other means must be adopted. Generally speaking, the philosophy of dividing a given frequency into a lesser frequency not a submultiple of the original frequency is as follows. In its most general form, the procedure is to divide the original frequency by an integral number to obtain a submultiple frequency and then to multiply such submultiple frequency by a second integral number. Referring again to the example set forth above, assume that it is desired to derive a 2400 c.p.s. signal from a 100 kc. signal. This can be accomplished by dividing the 100 kc. signal by 125 to produce a resultant 800 c.p.s. signal. Then, by multiplying the 800 c.p.s. signal by a factor 3 there will be obtained a 2400 c.p.s. signal. It can be seen that, in essence, the frequency of the 100 kc. signal has been multiplied by the fraction $3/125$.

One structure capable of performing such a function includes a seven-stage binary counter which will count to 128 and, with proper feedback means, can be made to recycle (or reset) at the count of 125, thus obtaining the division by factor 125. Now, in order to obtain multiplication by the factor 3, the counter can be tapped at three different points spaced apart by a number of counts which are made as equal as possible to each other. For example, the first tap can be placed at the 41st count, the second tap at the 83rd count and the third tap at the 124th count. There will be a spacing of 42 counts each between the first and second and the second and third taps, and a spacing of 41 counts between the third and the first tap. Thus, a frequency of 2400 c.p.s. is obtained from any one of the three taps.

One of the principal difficulties with the system discussed above is the lack of flexibility. More specifically, such a system would involve a considerable amount of fixed wiring in the circuit. For example, in order to recognize the count at each of the three taps occurring at the 41st, 83rd, and 124th count, it would be necessary to have three sets of seven leads; each set being supplied to a separate "and" circuit to identify the particular counts. Each of the seven leads of each set would be selected from the fourteen leads comprising the set and reset output terminals of the seven binary counters. Such a system is somewhat inflexible and does not lend itself well to conditions where it is desired to change the frequency from time to time.

A primary object of the invention is to provide a versatile means for dividing the frequency of a given signal in a large number of ways in addition to simple submultiples of said given frequency.

A second purpose of the invention is a frequency divider employing binary counters which may be readily adapted to divide the frequency of a given signal into any one of a large number of frequencies, including non-integral frequencies.

A third object of the invention is a simplified frequency divider circuit.

A fourth aim of the invention is the improvement of frequency dividers, generally.

In accordance with the invention, there is provided a first binary counter consisting of a plurality of stages and a second binary counter consisting of a plurality of stages. The first binary counter has a feedback control circuit associated therewith wherein said counter is caused to recycle at any given count (of input pulses supplied thereto) up to and including its full capacity. The second counter is driven by the first counter and counts once each time the first counter recycles. The second binary counter has a feedback control circuit similar to that of the first counter. In addition, the second binary counter has a control circuit associated therewith which is constructed to recognize a given count, or counts, of the second counter and to supply a signal to the feedback control circuit of said first counter to cause said first counter to recycle at a new and different count in accordance with the particular count of the second counter.

Thus, for example, the first counter may be set normally to count in cycles of 21. At the end of each cycle of 21 counts, the second counter will register one count in response to a signal from the first counter. When a particular count, say the fifth count, occurs in the second counter, the control circuit associated with said second counter will respond to said fifth count to supply back to the feedback control circuit of the first counter a control signal whereby the said first counter will be caused to recycle to a different starting count for its sixth recycling period. Referring again to the example used hereinbefore, that is, changing the frequency of 100 kc. to a frequency of 2400, the number of counts in the last recycling stage must necessarily be 20 so that the total number of input pulses supplied to the first counter in a full recycling period of the second counter is equal to 125. It is assumed that the second counter will recycle to its "0" position at its sixth count. The actual frequency obtained in the example immediately given above will be 4800 cycles per second. Consequently, it will be necessary, in this instance, to provide additional means for dividing by two in order to obtain the desired frequency of 2400 cycles per second.

In accordance with a feature of the invention, the first binary counter will recycle a given number of times over a single recycling period of a second counting. Since the first counter recycles a number of times during each cycle of the second counter, it is necessary that only one set of five leads be connected into the five-stage first binary counter in order to identify any recycle containing a given number of counts. Such a relatively small number of leads will permit an easy changing of the wiring in order to accommodate the obtaining of many different frequencies from a given frequency.

The above-mentioned, and other objects and features of the invention, will be more fully understood from the following detailed description thereof when read in conjunction with the drawings, in which:

FIGS. 1, 1a, and 1b are diagrams showing the various block symbols used in the block diagrams of the invention;

FIGS. 4 and 5 constitute a more detailed block diagram of the invention;

FIG. 6 shows how FIGS. 4 and 5 should be fitted together; and

FIG. 7 is a chart showing the recycling pattern of one of the first binary counters.

Figure 1:
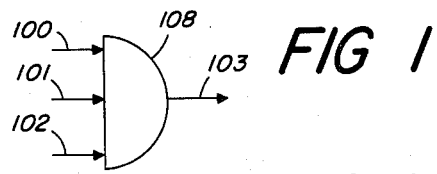

Before beginning a discussion of the circuits of the invention, a brief discussion of the symbols employed therein will be given. In FIG. 1 there is shown an "and" gate 108 having input leads 100, 101, and 102, and an output lead 103. In order to obtain an output signal on output 103 it is required that signals of a given potential be applied to all three input leads 100, 101, and 102, simultaneously. In the particular embodiment of the invention to be described herein, the signal waveforms employed will be two-level square wave type signals. The two levels of the signal will be described as an upper level and a lower level, with the upper level being the higher potential. The "and" gates employed herein are of the type that respond to the simultaneous presence of low-level signals only in order to produce an output signal, which is also a low-level signal. If any one of the input leads 100, 101, or 102 has a high-level signal thereon, there will be no output signal on the output lead 103. It should, perhaps, be further noted that the low-level signals in this particular specification represent a binary "1" and that the high-level signals represent a binary bit "0." The actual transfer of a binary bit "1," however, into any of the stages of the counters occurs with the transition from a low-level signal to a high-level signal, i.e., the positive-going leading edge occurring during the transition from a low-level signal to a high-level signal constitutes the signal which energizes the counters employed in this invention.

Figure 1A:
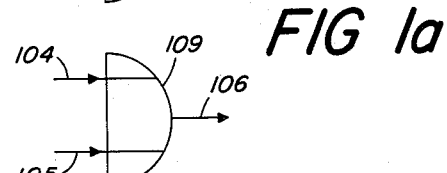

FIG. 1a shows what is defined herein as an "or" circuit. The "or" circuit 109 has input leads 104 and 105 and an output lead 106. As in the case of the "and" circuit of FIG. 1, the "or" circuit 109 produces a low-level output signal on the output lead 106 when a low-level input signal is applied to *either* of the leads 104 or 105. However, if a high-level signal is provided to both the input leads 104 and 105 there will be no output signal on the output lead 26.

Figure 1B:
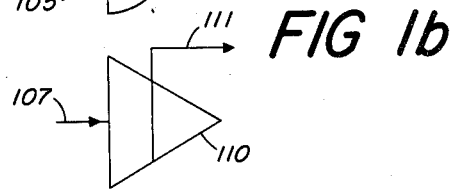

In FIG. 1b there is shown an inverter 110 having an input lead 107 and an output lead 111. The function of the inverter 110 is simply to invert the level of the signal supplied thereto. For example, if a low-level signal is applied to lead 107, a high-level signal will appear on the output lead 111. Conversely, if a high-level signal is applied to the input lead 107, a low-level signal will appear on the output lead 111.

Figure 2:
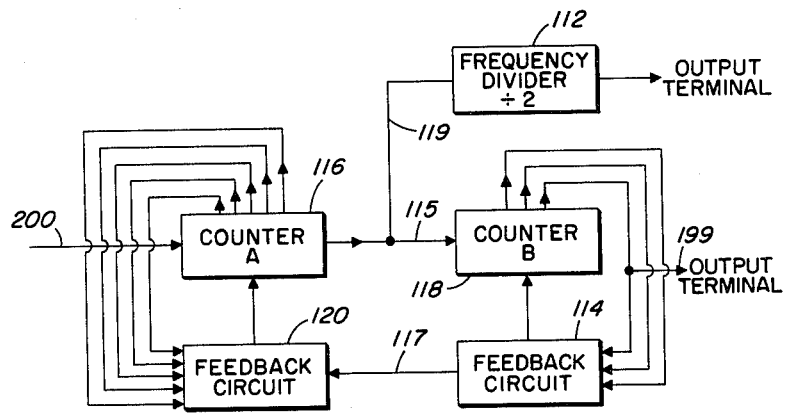
FIG. 2 is a block diagram showing the general form of the invention.

Referring now to FIG. 2, there is shown a block diagram of the basic circuit. Such basic circuit consists of first counter 116 with a feedback circuit 120 for controlling the recycling rate and a second counter 118, also with an associated feedback circuit 114 for controlling the recycling rate. Recycling rate or recycling count is herein defined as the number of counts between resets. A counter, such as counter 116, if it has five stages, has a maximum binary count of 32 (0 to 31, inclusively). Ordinarily, in the absence of a feedback circuit, when the counter counts to 31, the 32nd pulse will reset all the stages to "0" and the next input pulse will begin the count anew. However, as is well known in the art, a feedback circuit 120 can be employed which will cause resetting to occur at any desired count. For example, a counter with a potential maximum count of 31 can be made to reset every time it reaches the count of 20 or 25, or any other number less than 31.

Also, it is well known that a counter can be made to reset to a particular count (other than "0"), and then count to the end of its normal range. For example, a five-stage counter can be made to count between 11 and 31. When the count reaches 31, the counter is reset back to the count of 11; the recycling rate being 21 counts.

The counter 118, as indicated above, also has a feedback and control circuit 114 by which its recycling rate is controlled. An additional connection 117 exists between the feedback and control circuit 114 and the feedback circuit 120. Through this connection 117 a control signal can be passed from the feedback circuit 114 to the feedback circuit 120 to change the recycling rate of the counter 116. Thus, for example, the counter 118 which, let us assume to be a three-stage counter with a recycling rate of six counts will, in cooperation with its feedback circuit 114 produce an output pulse on the lead 117 every time the counter 118 recycles; that is, every time the counter 118 counts to six.

As indicated hereinabove, the counter 118 will step once each time the counter 116 recycles. Thus, it is possible to have the number of counts in a recycling count of counter 116 vary with the count of counter 118. For example, the recycling count corresponding to the first five counts of counter 118 can be a first number and the recycling count corresponding to the sixth count of the counter 118 can be a different number; the different recycling counts being attributable to the control signal supplied to feedback circuit 120 from feedback circuit 114 at the second count of counter 118.

In the example discussed hereinbefore, it was assumed that it was desired to derive a signal having a frequency of 4800 c.p.s. from a signal having a frequency of 100 kc. In order to accomplish this it is necessary that the 100 kc. signal be divided by a factor of 125 and then multiplied by a factor of three. This same result can be achieved by dividing by a factor of 125, then multiplying by a factor of 6 and, subsequently, dividing by a factor of 2, which is the specific manner in which the desired result is obtained by the block diagram of FIG. 2.

A complete cycle of the system (a system cycle) occurs when the counter 118 has recycled once. In order for the counter 118 to recycle once, it is necessary that the counter 116 recycle six times since the recycling count of counter 118 is set at six. Further, it is necessary that the total number of counts registered by the counter 116 during its six recycles of a system cycle be equal to 125 since 125 is the factor by which the 100 kc. input signal is to be divided. The multiplication factor 6 is obtained from the fact that the counter 116 will recycle six times during a complete system cycle of 125 counts.

As discussed hereinbefore, it is obvious that 125 is not integrally divisible by six. Consequently, as discussed hereinbefore, some of the recycling counts of the counter 116 will be different from other recycling counts. More specifically, five of the recycling counts will contain 21 counts, and the sixth recycling count will contain 20 counts, for a total of 125 counts. Thus, for every 125 cycles of the 100 kc. input there is produced on the lead 119 six pulses, thus producing a 4800 c.p.s. signal. The frequency divider 112 functions to divide such frequency by a factor 2 to produce a resultant frequency of 2400 c.p.s.

The general expression for dividing a given frequency may be derived in the following manner. Assume that the maximum count of the counter 116 is N and that the recycling count of the second counter is M. Assume further, that for a certain number of counts ($M-L$) of the second counter, the feedback circuit 120 will cause the first counter to recycle at a count of P, and that for L counts of the second counter the feedback circuit 120 will cause the first counter to recycle at the count of Q. Thus, the total number of counts counted by the first counter during a complete recycling count M of the second counter is equal to $$P(M-L)+LQ \qquad (1)$$

which in the specific example given above is equal to 125; L being equal to 1, P being equal to 21, M being equal to 6, and Q being equal to 20.

The fraction by which original frequency $f$ is multiplied is represented by the following expression:

$$\frac{M}{P(M-L)+LQ} \quad (2)$$

Multiplying the frequency $f$ by expression (2) gives the following result:

$$\frac{fM}{P(M-L)+LQ} \quad (3)$$

which represents the new frequency.

It is to be noted that the denominator of expression (3) must divide into $f$ an integral number of times. $M$ can be any integer.

When recycled to produce a count of P, the first counter 116 is reset to the count $(N-P-1)$.

Similarly, when reset to produce a count of Q, the said counter 116 is reset to a count of $(N-Q-1)$.

Referring now to FIGS. 4 and 5, there is shown a more detailed block diagram of the invention. Specifically, FIG. 4 shows a detailed block diagram of the counter 116 and the feedback circuit 120 of FIG. 2 and FIG. 5 shows a detailed block diagram of counter 118 and the feedback circuit 114 of FIG. 2. In FIG. 4, that portion of the circuit within the dotted block 116 represents counter 116 of FIG. 2 and that portion of the circuit within the dotted block 120 represents the feedback circuit 120 of FIG. 2. It can be seen that there are five stages in the counter 116 of the particular embodiment of the invention being described herein. Each of these stages comprises a flip-flop circuit; said flip-flop circuits being identified by the reference characters 213, 214, 215, 216, and 217. Each flip-flop circuit has two input leads, such as leads 118 and 119 of stage 213 and two output leads, such as leads 120 and 121 of the same stage. Each flip-flop, or binary device, has two states. When it is one of these states the flip-flop is said to contain a "1" and when it is in the other state it is said to contain a "0." More specifically, one of the output leads 120 and 121 will have impressed thereon a low-level signal and the other will have thereon a high-level signal. If the low-level signal appears on lead 121, the binary device 213 is said to contain a "1." Under these circumstances the output lead 120 will necessarily have a high-level signal thereon. On the other hand, if the low-level signal appears on the output lead 120, the binary device is said to have a "0" therein, and the lead 121 will have a high-level signal thereon. As mentioned briefly hereinbefore, the state of each of these binary devices 213 through 217 is changed only by the transition from a low-level signal to a high-level signal on one of the input leads. More specifically, the transition from a low-level signal to a high-level signal on lead 118 will produce a low-level signal on output lead 120. Similarly, a transition from a low-level signal to a high-level signal on input lead 119 will produce a low-level signal on the output lead 121. If a low-level signal already exists on either of the output leads 120 or 121, then a subsequent low-level signal applied to the corresponding input leads 118 or 119, respectively, will produce no change in the condition of the binary device 213.

It will be noted that the input leads to each of the five binary devices 213 through 217 are connected to the outputs of "and" gates 126 through 135. All of the input leads to any of these "and" gates must be low-level signal (representing "1's") in order for the output signal thereof to be a low-level signal. If any one of the input leads to the "and" gates 126 through 139 is a high-level signal, the "and" gate is closed. In this specification the term "closed" applied to an "and" gate means that a high-level signal appears on the output terminal thereof. The term "open" means that a low-level signal will be created on the output terminal of said "and" gate.

The particular type of binary counter shown in block 116 is what is known as synchronous counter. The salient characteristic of a synchronous binary counter is that all of the stages thereof will change states simultaneously when a new count is received (i.e., all of the stages that are going to change states on said new count). The foregoing is true since the 100 kc. input signal supplied to input lead 200 is connected to an input terminal of all of the "and" gates 126 through 135 and will, consequently, energize all stages simultaneously with each input pulse. For example, lead 185 connects the input terminal 200 to the input of gate 126, and lead 143 connects the input lead 200 to the gate 131. Further, each binary stage has a carry-over connection between each of its output terminals and the opposite input "and" gate. For example, the output lead 121 of stage 1 (binary device 213) is connected to the input of gate 126 and the output lead 120 of the same stage is connected to the input of gate 127. Thus, the input terminal carrying the input signal and the carry-over leads account for two of the input leads to each of the gates 126 through 135. The remainder of the leads to the said input gates come from carry-forward leads and from the feedback circuit, both of which will be discussed hereinafter.

The carry-forward leads are leads that run from the output of each binary stage to the input of the gates of all following stages. For example, the carry-forward lead 202 which is connected to the output 121 of the first stage 213 is connected to "and" gates 128 through 135, inclusively. Similarly, the carry-forward lead 137 of the second stage 213 is connected to the input of "and" gates 130 through 135, inclusively. In a like manner, the last "and" gates 134 and 135 of stage 117 each receive four carry-forward leads, one from each of the preceding stages 213, 214, 215, and 216. In the absence of any feedback circuit, such as shown within the block 120, the binary counter 116 would simply count over and over again through 0 to 31. However, it is desired that the binary counter 116 count five times through a cycle of 21 counts (from 11 to 31) and then once through a cycle of 20 counts (from 12 to 31) to complete a system cycle of 125 counts. To accomplish the cycle of 21 counts there is provided a feedback circuit 120 which consists of "and" gates 142, 148, 149, and 153, and inverters 146, 150, and 155. An examination of the counter 116 will show that stages 213, 214, and 216 must not be reset to "0" at the 32nd count in order for the new count to start from a count of 11 (stage 213 should have a stored count of 1; stage 214, a stored count of 2; and stage 216, a stored count of 8).

Generally speaking, the function of the feedback circuit is to insure that stages 1, 2, and 4 are not reset to "0" at the 32nd count. Such function is accomplished in the following manner. After the 31st count the five stages each contain a "1" therein. Thus the output leads 121 through 125, each of which are connected to the "and" gate 142 of feedback circuit, contain a low-level signal so that there is a low-level on the output lead 145 of the "and" gate 142. Now, except when the counter 118 of FIG. 5 registers a count of five, there will be a high-level signal representing a "0" on the lead 117 connecting the counter 118 to the "and" gate 148 and inverter 146 of the feedback circuit 120 of FIG. 4. Such a high-level signal will automatically close the gate 148, thus causing a high-level signal to appear at the output 151 thereof. However, due to the inverter 146 of feedback circuit 120, a low-level signal will be received on the lead 147 to the "and" gate 149. Thus, during the first five counts of the count cycle of counter 118 of FIG. 5 there will appear a low-level signal at the output of the "and" gate 149 after the 31st count of the counter 116 of FIG. 4. However, the inverter 150 functions to invert the low-level output signal of the "and" gate 149 so that a high-level output signal appears on the lead 144, which high-level signal is supplied to input terminals of "or" gate 153 and the "and" gates 126 and 128 of stages 213 and 214, respectively. Such high-level signals prevent the opening of gates 126, 128, and 132 when the 32nd count occurs. Thus, the stages 213, 214, and 216 are prevented from resetting to "0" but will retain a "1" on the 32nd count so that the counter is reset to a count of 11.

It is to be noted that, except at the 31st count of the binary counter 116, there will be a high-level signal on the output lead 145 of "and" gate 142. Such high-level signal will result in a low-level signal appearing on the lead 144 due to the action of the inverter 150. Thus, the "and" gates 126, 128, and 132 will have a low-level signal supplied thereto from lead 144 at all times, except during the 31st count; thus causing no effect on the counter 116, except at the 32nd count.

Such resetting of counter 116 to a count of 11 will occur for the first five counts of the counter 118 of FIG. 5, thus creating a cumulative count of 5 times 21, or 105 counts. After the fifth count has been registered in the counter 118 of FIG. 5, however, a low-level signal will appear on the lead 117 of FIGS. 4 and 5, which will produce a different count cycle in the counter 116 (FIG. 4) during the sixth count cycle thereof. Such different count cycle occurs in the following manner.

Due to the presence of the low-level signal in lead 117, the "and" gate 149 of feedback circuit 120 will be closed since the inverter 146 will invert the said low-level signal to produce a high-level signal on the lead 147. However, the gate 148 will be in a condition now to be opened upon occurrence of the 32nd count of the counter 116. More specifically, when said 32nd count (actually the 21st count since the counter was reset to 11) occurs, a low-level signal will appear on output terminal 145 of "and" gate 142 and, consequently, will appear on the input lead 201 to "and" gate 148. Now, since both input leads of "and" gate 148 have a low-level signal impressed thereon, a low-level signal will appear on the output terminal 151 thereof, which output signal will be inverted to a high-level signal by inverter 155. Such high-level signal will appear on lead 154 which is connected to the input of "or" gate 153 and also the input of "and" gate 130 of stage 215 of counter 116, thus preventing stages 215 and 216 from resetting when the 32nd count occurs. Consequently, only stages 1, 2, and 5 will be reset to "0" so that reset counting on the sixth cycle begins at the count of 12 and contains only 20 counts for a total cumulative count of 125.

The system cycle is then completed and at the end of the sixth cycle, the output signal appearing on the output lead 185 of counter 116 will cause the counter 118 of FIG. 5 to reset to "0," in a manner to be explained in the following paragraph.

Referring now specifically to the counter 118 of FIG. 5, it will be observed that in the particular embodiment of invention described herein there are three stages in said counter. Associated with said counter is a feedback circuit 114 which limits the count of the counter 118 to a count of six in much the same manner as the feedback circuit 120 of FIG. 4 does with respect to the counter 116 of FIG. 4. However, in the case of the structure of FIG. 5 the count runs from "0" to 5, rather than from 2 to 7, 7 being the maximum storable count of the 3-stage counter. The input terminal 185 receives pulses from the output of the counter 116 of FIG. 4. Like the counter of FIG. 4, the counter 118 in FIG. 5 is a synchronous counter with each stage having two "and" gates connected to the input thereof. More specifically, there are six "and" gates 186, 187, 188, 189, 190, 191 associated with the three stages 176, 177, and 178, two "and" gates per stage. The "and" gates 186, 188, and 190 have their output connected to the reset inputs 156, 157, and 158 of stages 176, 177, and 178, respectively, while the "and" gates 187, 189, and 191 have their outputs connected to the input terminals 159, 160, and 161 of stages 176, 177, and 178, respectively. Carry-forward leads 162 and 163 perform the same function as the carry-forward leads of counter 116 of FIG. 4. Similarly, each stage has crossover leads connected from the two output terminals to the "and" gate connected to the opposite input terminal. For example, crossover lead 165 of stage 176 is connected from the reset output terminal to the input terminal of gate 187.

As indicated above, the feedback circuit 114 is designed to cause a recycling rate of 6 counts. More specifically, the counter 118 will go through the count cycle running from "0" to 5 and then back to "0" for a total count of 6. The 6th and 7th counts are skipped.

The count cycle of counter 118 is accomplished by means of the feedback circuit 114 which has three input leads 175, 179, and 180 connected thereto and which originate, respectively, from the right-hand output (set) terminal 175 of stage 176, the left-hand output (reset) terminal 179 of stage 177, and the output terminal 180 of stage 178. Thus, when stages 176 and 178 contain a "1" and stage 177 contains a "0," i.e., when the total count contained in the counter is 5, there will be low-level signals on all three input leads 175, 179, and 180 of "and" gate 193. Thus, a low-level input signal will appear on the output lead 168 of "and" gate 193, which low-level signal will be inverted to a high-level signal by inverter 183. The resultant high-level signal appearing on the output terminal 169 of inverter 183 will be supplied to the gate 189 of stage 177, thus preventing said stage 177 from registering a count 6 which would ordinarily be registered in the counter.

Also, on the 6th count the first stage 176 will change to a "0" and the third stage 178 will change to a "0," in the following manner. "Or" gate 182 has two input leads 163 and 170. The input lead 163 is supplied to the carry-forward lead from stage 177, as discussed hereinbefore. However, after the count 5 the carry-forward lead 163 of stage 177 normally is at a high level since stage 177 contains a binary "0." Consequently, the gate 190 of stage 178 could not, in the absence of other means, cause stage 178 to change to its "0" state. However, the means for causing stage 178 to change to its "0" state are provided by supplying a substitute low-level signal from "and" gate 193 through the "or" gate 182. Thus, the third stage 178 will change to a "0" state when the 6th count is entered since all four input leads to gate 190 have a low-level signal impressed thereon. More specifically, stage 178 changes state when the input pulse from counter 116 of FIG. 4 changes from a low-level to a high-level signal. Such change from a low-level signal to a high-level signal appears on the output lead 158 of gate 190 and it is this positive-going transition that changes the state of the binary stage 178.

Figure 3:
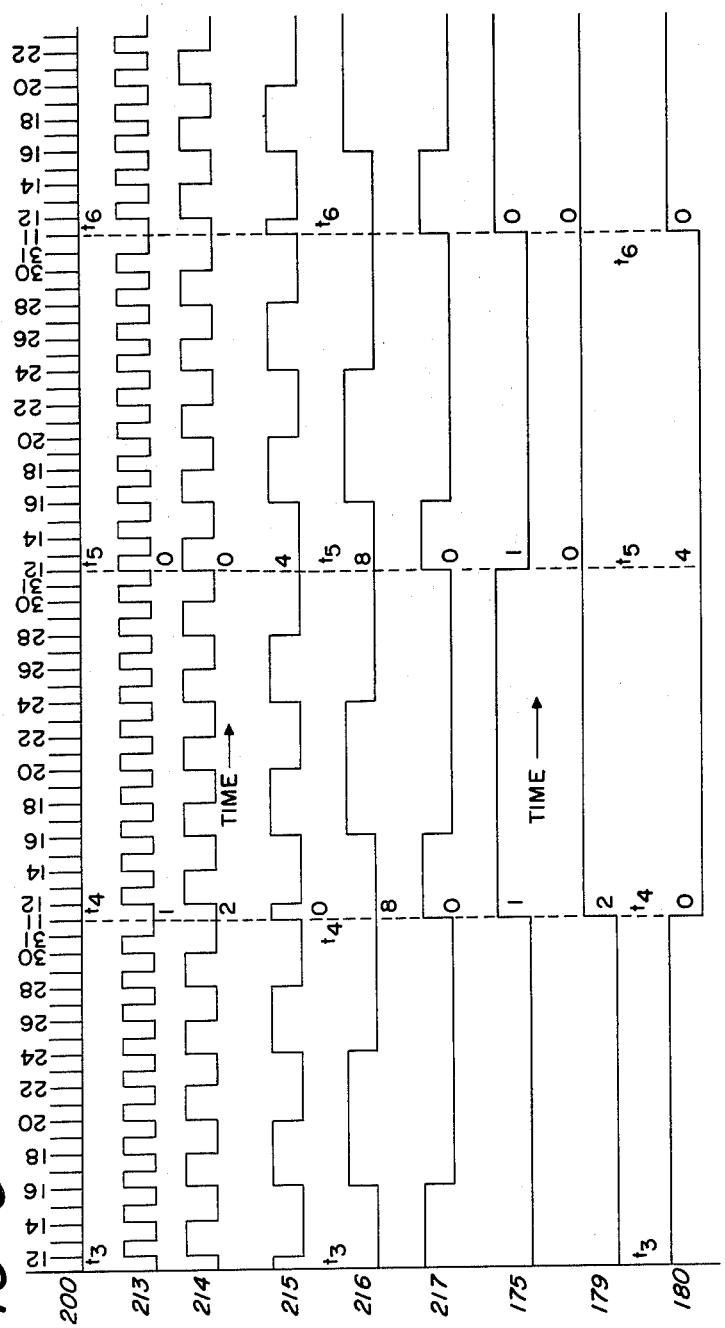
FIG. 3 is a set of curves showing the waveforms occuring at various points in the invention, as shown in FIGS. 4 and 5.

Operation of the circuits of FIGS. 4 and 5 may be better understood with respect to the curves of FIG. 3 in which curve 200 represents the 100 kc. input signal to the binary counter 116 of FIG. 4 and is supplied on input lead 200. The curves 113, 114, 115, 116, and 117 refer respectively to the signals appearing on the output terminals 121 through 125 of the five stages 213 through 217 of binary counter 116 of FIG. 4. The last-mentioned curve 217 represents the signal supplied to the input lead 185 to the three-stage binary counter 118. The curves 175, 179, and 180 of FIG. 3 represent the signals appearing on the output leads of the three stages 176, 177, and 178, respectively, of the binary counter 118 of FIG. 5.

The time $t_6$ of the curves 175, 179, and 180 represents the time that the sixth count is received from the preceding binary counter 116. It will be observed that upon reception of the sixth count at time $t_6$ the first stage 176 and the third stage 178 change to their "0" states and that the second stage 177 maintains its "0" state. Thus, all three stages of counter 118 are in their "0" state which represents the conditions existing at time $t_0$ (not shown in FIG. 3) and marks a completion of the cycle.

After the fifth count a low-level signal will exist on the lead 117 and will be supplied back to the feedback circuit 120 of FIG. 4 where it will cause a change of recycling count of the binary counter 116 of FIG. 4 in a manner discussed hereinbefore. When the sixth count occurs all stages of the binary counter 118 of FIG. 5 will be reset to "0" and the signal appearing on the lead 117 will be a high-level signal again until the fifth count of the counter 118 reoccurs.

It is to be noted that all the waveforms of FIG. 3 have the same time base. For purposes of best relating the operation of the structure, the curves of FIG. 3 show the third, fourth, fifth, and part of the sixth cycle of the six cycles of binary counter 118. Thus, time $t_3$ represents the moment when the third recycling of counter 116 occurs and, more specifically, represents the time at which the 32nd pulse occurs to return the binary counter 116 to a count of 11 in its third recycle. As can be seen from the chart of FIG. 6, the first stage 113 at time $t_3$ contains a "1," the second stage 114 contains a "1," the third stage 115 contains a "0," the fourth stage 116 contains a "1," and the last stage 117 contains a "0." The curves 113 through 117 of FIG. 3, at time $t_3$, are drawn to correspond to these particular reset conditions.

At this time $t_3$ the binary counter 118 of FIG. 5 contains the count of three so that the first stage 176 contains a "1" as represented by curve 175 of FIG. 3, the second stage 177 contains a "1" as represented by curve 179 of FIG. 3, and the third stage 178 contains a "0" as represented by curve 180 of FIG. 3. The input pulses 200 continue until the count of 31 is reached. The next input pulse functions to reset the binary counter 116 back to count 11 at time $t_4$, so that the conditions of each of the stages 113 through 117 of time $t_4$ coincide with the condition of each of the stages of time $t_3$. The counting then proceeds again up to 31 whereupon the next succeeding count will reset the counter 116 to count 12 at time $t_5$. It is to be understood that each time the count is reset back either to 11 (or 12) an output pulse is supplied from the fifth stage 117 of binary counter 116 to the input of binary counter 118 so that following time $t_5$ the binary counter 118 contains a count of five, as shown by curves 175, 179, and 180. The counting in the binary counter 116 then proceeds again to 31.

At the next input pulse 200 the counter 116 is reset to 11, as shown at time $t_6$, so that the conditions of the five stages 113 through 117 again coincide to the condition of said stages at time $t_3$.

Due to the fact that reset to "0" is not effected for all states, the waveforms in some stages are irregular. For example, the waveform 115 contains an irregularity at times $t_4$, $t_5$, and $t_6$.

At time $t_6$ the binary counter 118 of FIG. 5 receives its sixth count from the binary counter 116 and recycles to a "0" condition so that all three stages of counter 118 contains a "0."

It is to be noted that the form of the invention shown and described herein is but one embodiment thereof and that various changes may be made in circuit configuration, and in the number of stages of the binary counters employed therein, and in the feedback circuits, without departing from the spirit and the scope of the invention.

We claim:

1. Means for dividing a frequency $f$ comprising first counter means constructed to have a maximum count N, first feedback means responsive to the count of said first counter means to cause recycling of said first counter means each P counts, where P is less than N, other circuit means including second counter means having a recycling count M and constructed to be responsive to said first counter means to advance one count each time said first counter means recycles, said other circuit means constructed to respond to a predetermined count condition of said second counter means to produce an output signal, said first feedback means constructed to respond to said output signal from said other circuit means when said second counter means contains said predetermined count to cause recycling of said first counter means after Q counts, where Q is less than N and different from P, whereby the total number of counts occurring in the total recycling of said first counter means during a complete cycle of said second counter means equals $P(M-1)+Q$ and the output frequency of any stage of said second counter is equal to $$\frac{Mf}{P(M-1)+Q}$$

2. Frequency dividing means in accordance with claim 1 in which said first counter means comprises a synchronous type binary counter means having X stages arranged in cascade where $X=\log_2 N$, each of said X stages having input means and output means, in which said first feedback means comprises first gating means having a plurality of input terminals connected to selected output terminals of said stages and responsive to the output signals of said X stages when said first binary counter contains a count of $N-1$ to produce an output signal, said first feedback means further comprising first reset circuit means responsive to the output signal from said gating means and to the input signal causing the Nth count to cause said first counter means to reset to a count $N-(P+1)$.

3. Frequency dividing means in accordance with claim 2 in which said first reset circuit means is constructed to respond to an output control signal from said other circuit means to cause said first counter means to rest to a count $N-(Q+1)$.

4. Frequency dividing means in accordance with claim 3 in which said second counter means is a synchronous type binary counter having a plurality of stages with each stage having input and output terminals, and in which said other circuit means also includes a second feedback means having a second gating circuit means with input leads connected to selected output terminals of the stages of said second counter means to produce said output control signal when said second binary counter means contains a predetermined count, said second feedback means comprising second reset circuit means constructed to respond to the output signal of said second gating circuit means to cause said second counter means to reset to another predetermined count.

5. Frequency dividing means in accordance with claim 3 in which said second counter means is a synchronous type binary counter having a plurality of stages with each stage having input and output terminals, and in which said other circuit means includes a second feedback means comprising second gating circuit means having input leads connected to selected output terminals of the stages of said second counter means to produce said output control signal when said second counter means contains a predetermined count.

6. Means for dividing a frequency $f$ comprising first counter means constructed to have a maximum count N, first feedback means responsive to the count of said first counter means to cause recycling of said first counter means each P counts, where P is less than N, second counter means having a predetermined recycling count M and constructed to be responsive to said first counter means to advance one count each time said first counter means recycles, control circuit means constructed to produce an output signal in response to at least one predetermined count of said second counter means, said first feedback means constructed to respond to the output signal of said control circuit means to cause recycling of said first counter means ofter Q counts, where Q is less than N and different from P, the said first feedback means and the said control circuit means being constructed to coact to cause the total number of counts occurring in the total recyclings of said first counter means during a complete cycle of said second counter means to equal R counts, where R is divisible into $f$ an integral number of times so that the output frequency of a stage of said first counter is equal to $$\frac{Mf}{R}$$

7. Frequency dividing means in accordance with claim 6 in which said first counter means comprises a synchronous type binary counter means having X stages arranged in cascade where $X=\log_2 N$, each of said X stages having input means and output means, in which said first feedback means comprises first gating means having a plurality of input terminals connected to selected output terminals of said stages and responsive to the output signals of said stages when said first binary counter contains a count of $N-1$ to produce an output signal, said first feedback means further comprising first reset circuit means responsive to the output signal from said gating means and to the input signal causing the Nth count to cause said first counter means to reset to a count $N-(P+1)$.

8. Frequency dividing means in accordance with claim 7 in which said first reset circuit means is constructed to respond to an output control signal of said control circuit means to cause said first counter means to reset to a count $N-(Q+1)$.

9. Frequency dividing means in accordance with Claim 8 in which said second counter means is a synchronous type binary counter having a plurality of stages with each stage having input and output terminals, and in which said control circuit means comprises second feedback means having second gating circuit means with input leads connected to selected output terminals of the stages of said second counter means to produce said output control signal when said second binary counter means contains a predetermined count, said second feedback means further comprising second reset circuit means constructed to respond to an output signal of said second gating means to cause said second counter means to reset to another predetermined count.

10. Frequency dividing means in accordance with claim 8 in which said second counter means is a synchronous type binary counter having a plurality of stages with each stage having input and output terminals, and in which said control circuit means comprises second feedback means including second gating circuit means with input leads connected to selected output terminals of the stages of said second counter means to produce said output control signal when said second binary counter means contains a predetermined count.

References Cited by the Examiner

UNITED STATES PATENTS 2,558,447  6/1951  MacSorley _____ 328—48

ROBERT C. BAILEY, *Primary Examiner.*

MALCOLM A. MORRISON, *Examiner.*

M. P. ALLEN, T. M. ZIMMER, *Assistant Examiners.*

UNITED STATES PATENT OFFICE
CERTIFICATE OF CORRECTION

Patent No. 3,230,352                  January 18, 1966

George F. Grondin et al.

It is hereby certified that error appears in the above numbered patent requiring correction and that the said Letters Patent should read as corrected below.

Column 10, line 25, for "rest" read -- reset --.

Signed and sealed this 6th day of December 1966.

(SEAL)

Attest:

ERNEST W. SWIDER
Attesting Officer

EDWARD J. BRENNER
Commissioner of Patents